United States Patent
Hochberg et al.

(10) Patent No.: US 7,289,694 B2
(45) Date of Patent: Oct. 30, 2007

(54) COUPLED SEGMENTED WAVEGUIDE STRUCTURES

(75) Inventors: Michael J. Hochberg, Pasadena, CA (US); Tom Baehr-Jones, Pasadena, CA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/280,854

(22) Filed: Nov. 15, 2005

(65) Prior Publication Data

US 2006/0133720 A1  Jun. 22, 2006

Related U.S. Application Data

(63) Continuation-in-part of application No. 11/146,940, filed on Jun. 7, 2005.

(60) Provisional application No. 60/691,548, filed on Jun. 17, 2005, provisional application No. 60/629,675, filed on Nov. 19, 2004.

(51) Int. Cl.
*G02B 6/26* (2006.01)
*G02B 6/42* (2006.01)
*G02B 6/10* (2006.01)

(52) U.S. Cl. .......................................... 385/15; 385/129
(58) Field of Classification Search .................... None
See application file for complete search history.

(56) References Cited

U.S. PATENT DOCUMENTS

| 5,408,492 A * | 4/1995 | Vossler et al. ................. 372/94 |
| 5,459,800 A * | 10/1995 | Enokihara et al. ............. 385/3 |
| 5,491,762 A * | 2/1996 | Deacon et al. ................. 385/16 |
| 2002/0081055 A1* | 6/2002 | Painter et al. .................. 385/2 |
| 2003/0123780 A1* | 7/2003 | Fischer ......................... 385/15 |

OTHER PUBLICATIONS

Almeida et al., "Guiding and Confining Light in Void Nanostructure," 2004, Optics Letters, p. 1209-1211.*

* cited by examiner

*Primary Examiner*—Michelle Connelly-Cushwa
*Assistant Examiner*—Chris Chu
(74) *Attorney, Agent, or Firm*—Ladas & Parry, LLP

(57) ABSTRACT

Segmented waveguides electrically coupled to a resonator and methods for electrically coupling waveguides to a resonator are disclosed. The resonator can be a split ring resonator. The disclosed structures can be useful to fabricate waveguide devices included, for example, in sensors and optical elements.

16 Claims, 3 Drawing Sheets

COUPLED SEGMENTED WAVEGUIDE STRUCTURES

CROSS REFERENCE TO RELATED APPLICATIONS

The present application claims the benefit of provisional application 60/629,675, for "Split Ring Optical Cavities and Optical Cavities with Electrical Connections" filed on Nov. 19, 2004, and provisional application 60/691,548, for "Split Ring Optical Cavities and Split Optical Cavities with Electrical Connections" filed on Jun. 17, 2005, both of which are incorporated herein by reference in their entirety. The present application is also a continuation-in-part of U.S. application Ser. No. 11/146,940, for "Segmented Waveguide Structures" filed on Jun. 7, 2005, also incorporated herein by reference in its entirety.

FEDERAL SUPPORT

The invention described herein was made in performance of work under contract No. N00421-02-D-3223 awarded by the Naval Air Warfare Center Aircraft Division. The U.S. Government has certain rights in the invention.

BACKGROUND

1. Field

The present disclosure is directed to waveguide structures, and in particular, to segmented waveguide structures coupled to a resonator.

2. Related Art

Waveguide-based integrated optics in silicon provides an ideal platform for concentrating and guiding light at the nanoscale. See R. A. Soref, J. P. Lorenzo, "All-Silicon Active and Passive Guided-Wave Components For Lambda=1.3, and 1.6, MU-M," IEEE J. Quantum Elect. 22, 873-879 (1986). The high index contrast between silicon and common cladding materials enables extremely compact waveguides with very high mode field concentrations, and allows the use of established CMOS fabrication techniques to define photonic integrated circuits. See A. S. Liu, R. Jones, L. Liao, D. Samara-Rubio, D. Rubin, O. Cohen, R. Nicolaescu, M. Paniccia, "A high-speed silicon optical modulator based on a metal-oxide-semiconductor capacitor," Nature 427, 615-618 (2004), A. Scherer, O. Painter, J. Vuckovic, M. Loncar, T. Yoshie, "Photonic crystals for confining, guiding and emitting light," IEEE T. Nanotechnol. 1, 4-11 (2002), and A. Layadi, A. Vonsovici, R. Orobtchouk, D. Pascal, A. Koster, "Low-loss optical waveguide on standard SOI/SIMOX substrate," Opt. Commun 146, 31-33 (1998). It has recently become possible, by using slotted waveguides to further concentrate a large fraction of the guided mode into a gap within the center of a silicon waveguide. See Q. F. Xu, V. R. Almeida, R. R. Panepucci, M. Lipson, "Guiding and Confining Light in Void Nanostructures," Opt. Lett. 29, 1206-1211 (2004). This geometry greatly magnifies the electric field associated with the optical mode, resulting in electric fields in excess of $10^6$ V/m for continuous-wave, sub-milliwatt optical signals.

SUMMARY

According to a first aspect, a method for establishing electrical contact to a resonator is provided, comprising: providing a segmented waveguide electrically contacting the resonator.

According to a second aspect, a structure is disclosed, comprising: a resonator; and a segmented waveguide electrically contacting the resonator.

According to a third aspect, a structure comprising a resonator is disclosed, wherein the resonator is a ring resonator and comprises a slot waveguide.

DETAILED DESCRIPTION

Figure 1:
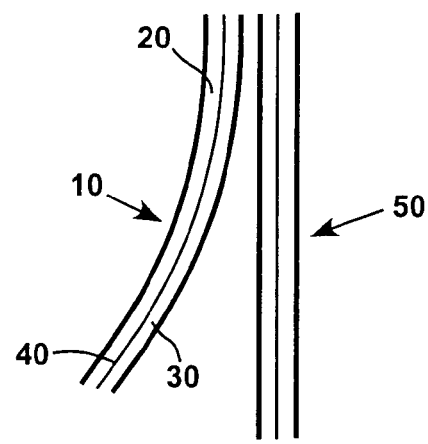
FIG. 1 shows a portion of a slot waveguide resonator coupled to an input waveguide.

FIG. 1 shows a portion of a slot waveguide resonator 10. The resonator 10 is made of silicon stripes 20, 30 separated by a small gap 40. The two silicon stripes can be formed by etching an SOI slab. The gap 40 can be approximately 60 nm in lateral width. Also shown in FIG. 1 is a portion of an input waveguide 50, to obtain electrical contact with the waveguide resonator 10. The input waveguide 50 can be any type of waveguide. FIG. 1 shows an input slot waveguide, by way of example. For a detailed description of the operation of the structure of FIG. 1, reference is made to the paper 'High-Q Optical Resonators in Silicon-On-Insulator Based Slot Waveguides' filed in the above mentioned provisional application 60/629,675 and 60/691,548 both of which are incorporated herein by reference in their entirety.

The shape of the resonator can be any kind of ring-shape including, but not limited to, circular and oval shapes. Further, the resonator can also have a shape which, although not necessarily circular, is in the same topological class as a ring. The resonator can also be a linear resonator, with the mirrors on the ends being formed by Bragg reflectors or other types of reflective structures.

Segmented waveguides are described in detail in U.S. application Ser. No. 11/146,940, also enclosed herein by reference in its entirety. The 'segmented' portion of the waveguide is a lateral extension or 'grating' of the waveguide, to be used as an electrical contact. The extension is usually lithographically defined during the same lithographic step as the waveguide definition etch.

Figure 2:
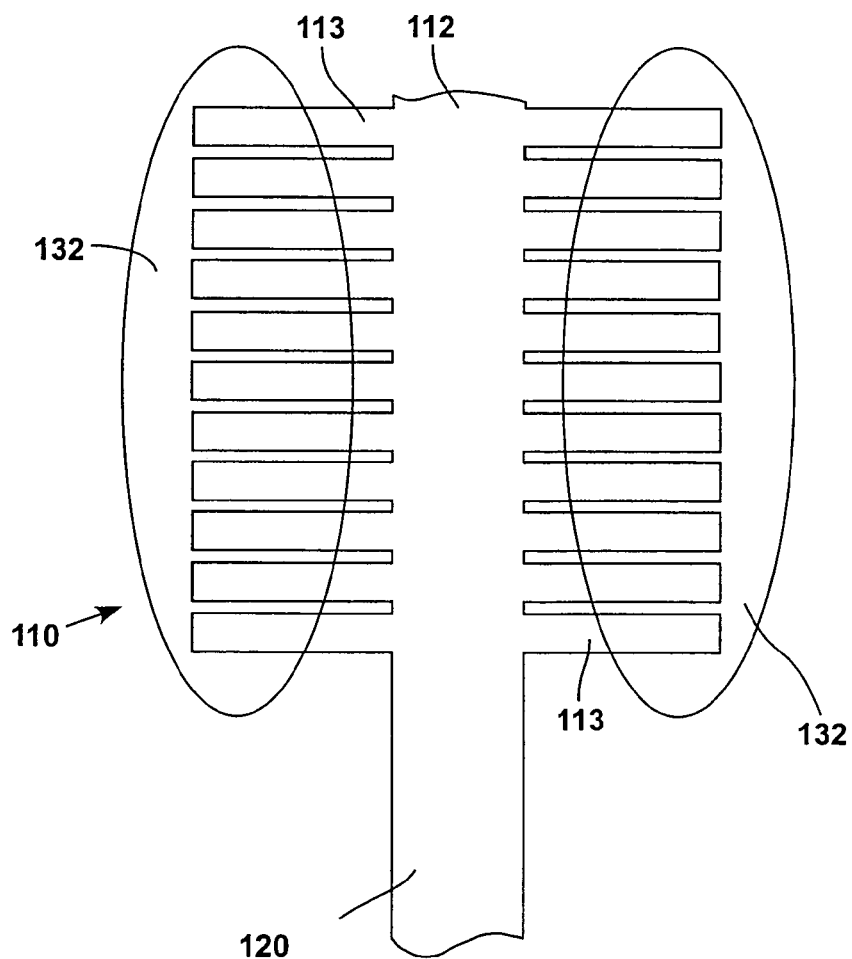
FIG. 2 shows a top view of a segmented waveguide coupled to a non-segmented waveguide.

FIG. 2 shows a top view of a segmented waveguide section 110 coupled to a non-segmented waveguide portion 120. Segmented section 110 comprises a plurality of segments 113 on opposite sides of a central elongate waveguide portion 112. Electrical contacts 132 are formed with the plurality of segments 113. The segmented waveguide could also include a slot down the center, dividing 120 into two portions, though this is not drawn on the figure.

Figure 3:
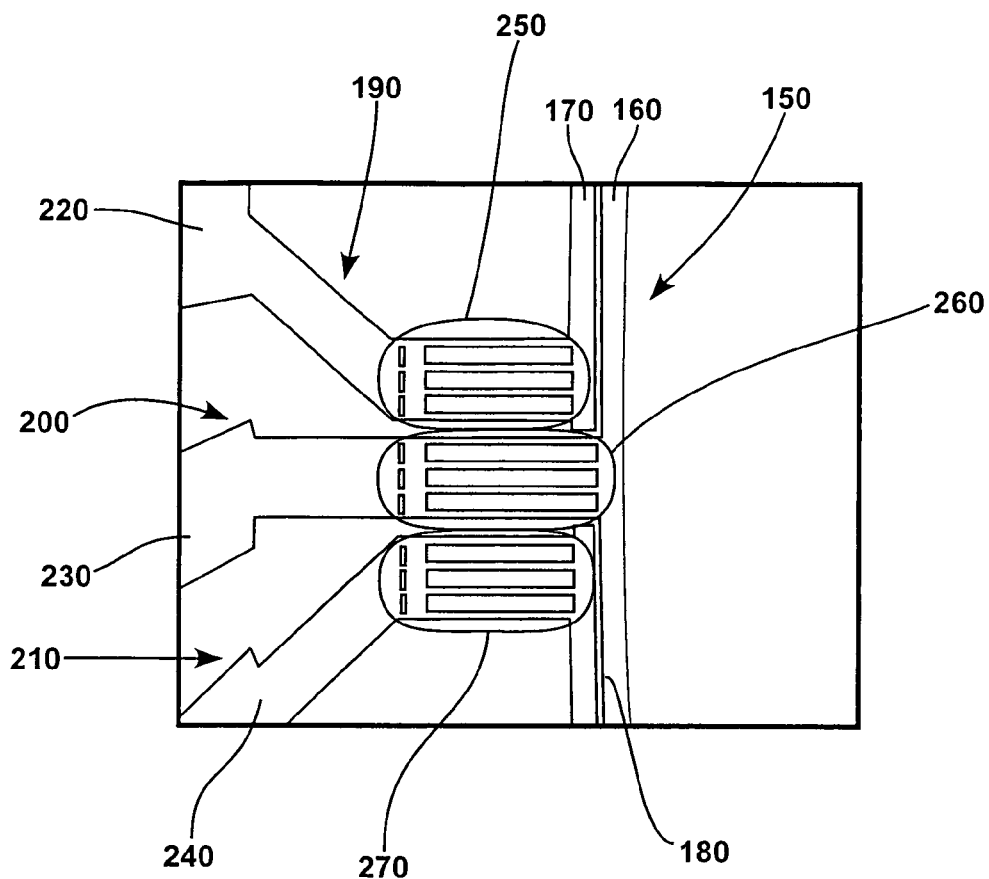
FIG. 3 shows a top view of a portion of a slotted ring resonator connected with segmented waveguides.

FIG. 3 shows a top view of a coupling between a ring resonator like the one shown in FIG. 1 and segmented waveguides like the one shown in FIG. 2. The coupling allows both sides of the slot ring resonator to be electrically contacted. Also, the segments could be arranged on either or both sides of the waveguide, which could or could not incorporate a slot. An example of having segments on both sides of a waveguide is shown in FIG. 2.

FIG. 3 shows a portion of a ring resonator 150, comprising an inner stripe or ring 160 and an outer stripe or ring 170 separated by a small gap 180. Also shown are waveguides 190, 200, 210 comprising non-segmented waveguide portions 220, 230, 240 and segmented waveguide portions 250, 260, 270. The segmented waveguide portions comprise a plurality of segments or contact bars, usually having a predetermined periodicity p, i.e. distance between two adjacent segments. The waveguides are usually located on a substrate. In accordance with a SOI technique, the waveguides are made of silicon, while the substrate is made of silicon dioxide, $SiO_2$.

Segmented waveguide portions 250 and 270 allow contact between the waveguides 190, 210 and the outer stripe 170 of the ring resonator. Segmented waveguide portion 260 allows contact between the waveguide 200 and the inner stripe 160 of the ring resonator.

During operation, the inner ring 160 can be maintained at a first voltage, while the outer ring 170 is maintained at a second voltage, different from the first voltage. In the structure shown in FIG. 3, waveguide 200 will be at the first voltage, while waveguides 190 and 210 will be at the second voltage.

FIG. 3 shows an embodiment where contact between input waveguide 200 and inner ring 160 is obtained by partially etching or piercing a portion of the outer ring 170. The person skilled in the art will understand that alternative types of contact can be provided. In particular, it is possible to construct segmented waveguides on either side of a regular or slotted waveguide. As part of a resonator, it is possible to construct structures which contact either side of a waveguide from either the inside or the outside of the ring, as shown in FIG. 2

The person skilled in the art will also understand that different kinds of designs are possible. These different designs can be obtained by varying the length of the contact bars, their periodicity, and so on, in order to minimize out-of-plane light scattering. Additionally, although a slotted or split ring resonator is shown, also a non-slotted split ring resonator can be used.

The structure shown in FIG. 3 can be enclosed in an active optical material, such as a material made of or including saturable absorbers, liquid crystals, electrooptic polymers, quantum dot doped polymers, electroluminescent polymers, other electroluminescent materials, Faraday rotator glasses, luminescent glasses, other luminescent materials, nonlinear glasses, in-situ grown semiconductor materials, organic sensor polymers, materials transducing environmental change into index of refraction change, nonlinear optical materials, laser dyes, fluids, and Chi-3 materials.

The structure of FIG. 3 can also be further integrated with radio frequency or microwave waveguides and/or be included into a high-index waveguide, due to the high index contrast between silicon and the cladding material. The high-index waveguide can be, for example, a silicon-on-insulator (SOI) waveguide, III-V materials waveguide, glass waveguides, polymer waveguide, and lithium niobate waveguides.

The structures disclosed in the present application can be useful to fabricate sensors and optical elements including the waveguide devices shown in FIGS. 1-3.

Figure 4:
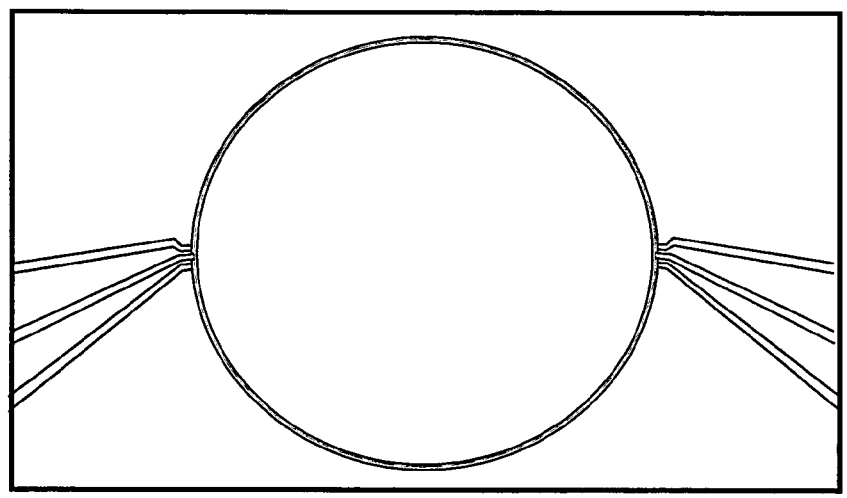
FIG. 4 is a top view of the entire ring resonator connected with input waveguides acting as electrical contact structures.

FIG. 4 shows a top view of a complete slotted ring resonator, with contact pads connected to both sides of the ring resonator. The presence of input waveguides on both sides, or in other embodiments, at several points on, the ring resonator will allow the electrical properties, such as resistance, capacitance and inductance, to be manipulated without destroying the optical properties of the structure.

Figure 5:
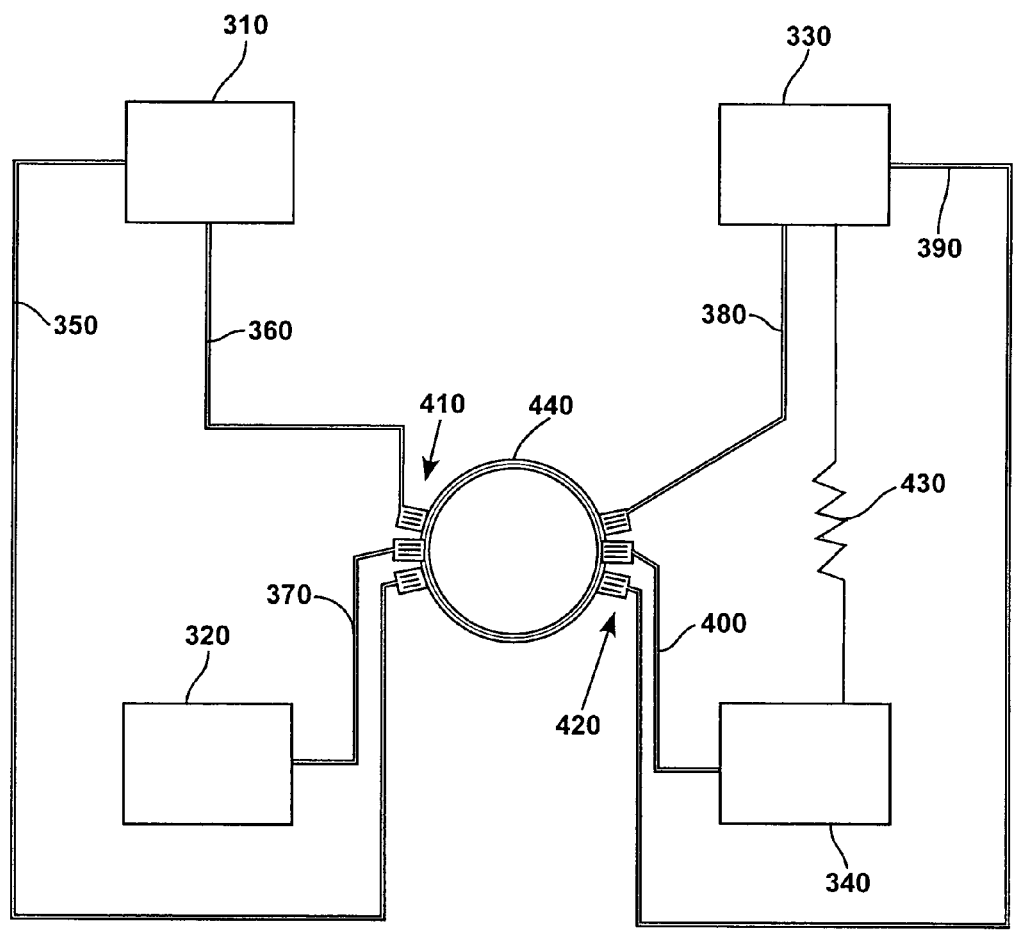
FIG. 5 is a diagram showing the logical layout of the circuit shown in FIGS. 3 and 4.

FIG. 5 shows a zoomed-out view of the structure of FIGS. 3 and 4, where contact pads 310, 320, 330 and 340 are shown, together with input waveguides 350, 360, 370, 380, 390 and 400, and their respective segmented portions 410, 420. A shunt resistor 430 provides a means of confirming electrical contact with the resonator 440. Typical pad-to-pad and pad-to-ring resistances range from 1 Mohm to 5 Mohm.

While several illustrative embodiments of the invention have been shown and described in the above description, numerous variations and alternative embodiments will occur to those skilled in the art. Such variations and alternative embodiments are contemplated, and can be made without departing from the scope of the invention as defined in the appended claims.

What is claimed is:

1. A method for establishing electrical contact to a resonator, comprising:
providing at least one segmented waveguide electrically contacting the resonator such that, during operation, a voltage is applied to said at least one segmented waveguide, wherein the at least one segmented waveguide comprises an elongate portion and a plurality of segments extending from the elongate portion, the plurality of segments contacting the resonator and applying said voltage to the resonator.

2. The method of claim 1, wherein the resonator is a ring resonator.

3. The method of claim 2, wherein the resonator is a split ring resonator.

4. The method of claim 2, wherein the resonator is a partially etched ring resonator.

5. The method of claim 1, wherein the resonator has a shape in a same topological class as a ring.

6. The method of claim 1, wherein the resonator is a linear resonator.

7. The method of claim 1, wherein the at least one segmented waveguide comprises plural segmented waveguides, a first set of the plural segmented waveguide establishing a first electrical contact and a second set of the plural segmented waveguides establishing a second electrical contact, the first electrical contact being different from the second electrical contact.

8. A structure comprising:
a resonator; and
at least one segmented waveguide electrically contacting the resonator such that, during operation, a voltage is applied to said at least one segmented waveguide, wherein the at least one segmented waveguide comprises:
an elongate portion and
a plurality of segments extending from the elongate portion, the plurality of segments contacting the resonator and applying said voltage to the resonator.

9. The structure of claim 8, wherein the at least one segmented waveguide comprises plural segmented waveguides, a first set of the plural segmented waveguides establishing a first electrical contact and a second set of the plural segmented waveguides establishing a second electrical contact, the first electrical contact being different from the second electrical contact.

10. The structure of claim 9, wherein the first electrical contact and the second electrical contact are established with a split waveguide.

11. The structure of claim 8, further comprising an active optical material enclosing the resonator and the at least one segmented waveguide.

12. The structure of claim 11, wherein the active optical material is selected from the group consisting of at least one between optically active materials, saturable absorbers, liquid crystals, electrooptic polymers, quantum dot doped polymers, electroluminescent polymers, other electroluminescent materials, Faraday rotator glasses, luminescent glasses, other luminescent materials, nonlinear glasses, in-situ grown semiconductor materials, organic sensor polymers, materials transducing environmental change into index of refraction change, nonlinear optical materials, laser dyes, fluids, and Chi-3 materials.

13. The structure of claim 8, wherein said structure is integrated with radio frequency waveguides.

14. The structure of claim 8, wherein said structure is integrated with microwave waveguides.

15. A high-index waveguide comprising the structure of claim 8.

16. The high-index waveguide of claim 15, wherein said high-index waveguide is selected from a group consisting of silicon-on-insulator (SOI) waveguides, III-V materials waveguides, glass waveguides, polymer waveguides, and lithium niobate waveguides.

* * * * *